(12) United States Patent
Karthauser

(10) Patent No.: US 7,687,585 B2
(45) Date of Patent: Mar. 30, 2010

(54) METHOD OF PRODUCING AN INTERPENETRATING POLYMER NETWORK (IPN), THE IPN AND USE THEREOF

(75) Inventor: Joachim Karthauser, Sollentuna (SE)

(73) Assignee: Biomodics, Lyngby (DK)

( * ) Notice: Subject to any disclaimer, the term of this patent is extended or adjusted under 35 U.S.C. 154(b) by 832 days.

(21) Appl. No.: 10/563,130

(22) PCT Filed: Jul. 2, 2004

(86) PCT No.: PCT/DK2004/000476

§ 371 (c)(1), (2), (4) Date: Jan. 3, 2006

(87) PCT Pub. No.: WO2005/003237

PCT Pub. Date: Jan. 13, 2005

(65) Prior Publication Data

US 2006/0148985 A1  Jul. 6, 2006

(30) Foreign Application Priority Data

Jul. 4, 2003  (DK) ............................... 2003 01027

(51) Int. Cl.
C08G 77/04  (2006.01)
(52) U.S. Cl. ................... 525/474; 427/536; 525/479
(58) Field of Classification Search .............. 525/474, 525/479; 427/536
See application file for complete search history.

(56) References Cited

U.S. PATENT DOCUMENTS

| | | | |
|---|---|---|---|
| 4,618,644 A | 10/1986 | Liu | |
| 4,740,538 A | 4/1988 | Sekutowski | |
| 4,766,183 A | 8/1988 | Rizk et al. | |
| 4,970,263 A | 11/1990 | Arkles et al. | |
| 5,085,859 A * | 2/1992 | Halloran et al. | 424/70.121 |
| 5,340,614 A | 8/1994 | Perman et al. | |
| 5,532,320 A | 7/1996 | Tripathy et al. | |
| 5,648,426 A | 7/1997 | Zolotnitsky | |
| 5,663,237 A | 9/1997 | Lee et al. | |
| 5,861,445 A | 1/1999 | Xu et al. | |
| 5,968,652 A | 10/1999 | Hanggi et al. | |
| 6,251,965 B1 | 6/2001 | Wang et al. | |
| 2001/0036617 A1 | 11/2001 | Karmaker et al. | |
| 2002/0052448 A1 | 5/2002 | Wang et al. | |
| 2002/0122946 A1 | 9/2002 | Kuck et al. | |
| 2003/0000028 A1 | 1/2003 | Molock et al. | |

FOREIGN PATENT DOCUMENTS

| | | |
|---|---|---|
| EP | 0 315 836 A2 | 5/1989 |
| EP | 315 836 * | 5/1989 |
| EP | 0 643 083 A1 | 3/1993 |
| WO | WO 98/40425 | 9/1998 |
| WO | WO 03/068846 A1 | 8/2003 |

OTHER PUBLICATIONS

Dan Li, Preparation of Nanometer Dispersed Polypropylene/polystyrene Interpenetrating Network Using Supercritical $CO_2$ as a Swelling Agent, Polymer 43, 2002, pp. 5363-5367.

* cited by examiner

*Primary Examiner*—Kuo-Liang Peng
(74) *Attorney, Agent, or Firm*—Buchanan Ingersoll & Rooney PC

(57) ABSTRACT

The invention comprises a method of producing an interpenetrating polymer network (IPN) comprising the steps of I) providing a silicone polymer composition; (ii) providing one or more monomers for a polymer; (iii) providing a solvent for the one or more monomers; iv) exposing said silicone polymer composition to said one or more monomers and said solvent to precipitate monomer within said silicone polymer composition and v) polymerizing said monomer to form an IPN, wherein said solvent has a surface tension at the exposing step of about 15 mNZm or less. It is preferred that the solvent, which is preferably $CO_2$, in the exposing step is in or near its supercritical state. The method is fast and simple, and the dispersion of the monomers may be controlled to thereby control the amount and distribution of the interpenetrating network in the silicone material. Further more the method results in new materials, where silicone polymers are used as the basic materials.

47 Claims, No Drawings

METHOD OF PRODUCING AN INTERPENETRATING POLYMER NETWORK (IPN), THE IPN AND USE THEREOF

TECHNICAL FIELD

The present invention relates to a method of producing an interpenetrating polymer network (IPN) and an IPN obtainable according to the method as well as applications of such IPN.

BACKGROUND ART

IPNs have been known for more than 40 years. IPNs are defined as macromolecular assemblies comprising two or more polymers wherein at least one is in the form of a network, the polymers are at least partially interlaced on a molecular scale but not covalently bonded to each other.

Because there is no chemical bonding between the networks (or polymer/network), each network may retain its individual properties independently of its individual proportion in the blend. As a result an improvement can be attained in properties such as mechanical strength, impact resistance, and toughness and other. There are two main types of IPNs, viz semi-IPN where at least one component is not in network form, and full IPN where all species are in network form.

US 2002/01222946 relates to a process of producing an IPN comprising: providing a liquid mixture comprising silicone oligomers and silsesquioxane oligomers; and curing the liquid mixture to form a composition of first and second polymers, the first polymer comprising the silsesquioxane oligomers cross-linked by siloxane bonds and the second polymer comprising a cross-linked silicone network formed in part from the silicone oligomers.

US 20030000028 provides a colorant for use in tinting contact lenses in which the binding polymer used is capable of forming an interpenetrating polymer network with the lens material. When the colorants of the invention are applied to uncured lens material that is subsequently cured, the binding polymer forms an interpenetrating polymer network with the lens material embedding the colorant within the lens material, resulting in a stable, tinted lens.

Several other methods for producing IPNs are known. The methods e.g. include simultaneously forming and cross-linking the polymer networks in the presence of each other. Other methods include forming a first network and thereafter swelling this network with monomers, cross-linking agents and optionally initiator/catalyst with or without solvents whereafter this monomer may form a polymer and optionally a network, e.g. as disclosed in US 2002/0052448.

Prior art silicone IPN's are made by vulcanizing or cross-linking block copolymers, such as adducts of silicone molecules and other polymer blocks, such as ethers, urethanes, and the like. However, in the use of prior art methods, the types of silicone IPNs and the freedom of design of properties of the IPNs are very limited.

Even though there are a lot of well working methods for producing IPNs there is still a need for new alternative methods in particular for producing silicone IPNs.

SUMMARY OF INVENTION

The objective of the present invention is to provide an alternative or an improved method of producing an IPN, which method is simple to use and inexpensive, and whereby a full IPN can be obtained.

Furthermore it is an objective to provide a method of producing an IPN, which method also can be used for the production of IPNs which are complicated or impossible to produce using the prior art methods.

This and other objectives as disclosed in the following description have been achieved by the invention as it is defined in the claims and described in the description.

The inventor has thus found that by using a solvent with low surface tension for monomers to be precipitated within a silicone polymer composition, it is possible to load monomers into the silicone polymer composition very fast and furthermore it is possible to load monomers which previously have not been possible to load into silicone polymer compositions.

Furthermore the amount of monomers that can be loaded into the silicone polymer composition may be relatively high compared with prior art methods.

DISCLOSURE OF INVENTION

The method according to the invention of producing an interpenetrating polymer network (IPN) comprises the following steps:

i) providing a silicone polymer composition, ii) providing one or more monomers for a polymer, iii) providing a solvent for the one or more monomers, iv) exposing said silicone polymer composition to said one or more monomers and said solvent to precipitate monomer within said silicone polymer composition v) polymerizing said monomer to form an IPN.

The silicone polymer composition may in principle be any type of silicone polymer composition, but basically the best result is obtained if the silicone polymer composition comprises at least 10%, such as at least 20%, such as at least 40%, such as at least 60% by weight of polymer having a backbone consisting of Si and O molecules.

In one embodiment, the silicone polymer composition comprises at least 10%, such as at least 20%, such as at least 40%, such as at least 60% by weight of polymer having a backbone consisting of Si molecules.

In one embodiment, the silicone polymer composition comprises at least 10%, such as at least 20%, such as at least 40%, such as at least 60% by weight of polysiloxane polymer.

Examples of useful silicones which separately or jointly can be comprised in the silicone polymer composition are dimethyl polysiloxan, methylphenyl polysiloxane, fluorosilicone rubber, silicone esters, polysiloxanes, polysilanes, chlorosilanes, alkoxysilanes, aminosilanes, polysilanes polydialkylsiloxanes, polysiloxanes containing phenyl substituents, said polymers of the silicone polymer composition optionally being vinyl-functionalized and/or optionally being partially or fully fluorinated.

The remaining of the silicone polymer composition may include other polymers, fillers and additives.

In one embodiment, the silicone polymer composition comprises up to 90% by weight of non-silicone polymers or co-polymers, fillers and/or additives.

The non-silicone polymers may e.g. be thermoplastics or thermosets, preferably selected from the group consisting of polyolefins, polyesters, polyurethanes, polycarbonates, polyvinyl polymers. In one embodiment the non-silicone polymers are selected from the group of polyamide, polyesters, polyether, polyethylene glycol, polysaccharide, cellulose, polyethylene, polypropylene, polybutylene, polyacrylonitrile, polyurethane, poly(vinyl chloride), poly(methyl methacrylate), polystyrene, polysulfone, polycarbonate, fluoropolymers such as polytetrafluoroethylene, polyvinyldifluoride, synthetic and natural rubber, thermoplastic elastomer, phenol-formaldehyde, melamine-formaldehyde, and urea-formaldehyde, -and mixtures thereof.

The fillers may e.g. be particles or fibres e.g. in the form of minerals or organic fillers, preferably selected from the group consisting of silica, metals, metal oxides, mixed metal oxides, glass beads or glass fibers. Other examples of fillers are those that are disclosed in U.S. Pat. No. 5,968,652, US 2001/00366617, U.S. Pat. No. 5,861,445 and U.S. Pat. No. 4,740,538, and in the co-pending application filed simultaneously with this application by the same applicant.

The additives may e.g. be selected from the group consisting of adhesion promoters for 2K-constructions, process and plasticizing oils, antioxidants and pigments.

The silicone polymer composition may be partly or totally vulcanized. The vulcanization degree has influence on its swelling properties, and consequently a totally vulcanized silicone polymer composition may for some compositions be difficult to swell with the solvent carrying large monomers.

The silicone polymer composition may also deliberately be only partly vulcanized, such as below 98%, such as below 95%, in order to enlarge the "channels" or cavities in which reactive monomers are deposited.

In one embodiment, the silicone polymer composition is partially vulcanized, such as up to a vulcanization degree (cross-linking degree) of at least 50%, such as at least 70%, such as at least 90% or wholly, such as at least 96%, such as at least 97%, such as at least 98%.

In one embodiment, the silicone polymer composition is a vulcanized rubber.

The silicone polymer composition may preferably be at least partly transparent. In one embodiment, a transparent silicone polymer composition is loaded with monomer and e.g. peroxides and is thereafter subjected to an activation step e.g. heating for polymerization and cross-linking the monomers. The resulting product is of milky-white appearance, presumably due to a microstructure of small domains in size below or in the order of the wavelength of visible light, in addition due to different refractive indices of silicone versus monomer, and possibly due to the interpenetrating network structure formed, depending on the concentration of the monomer.

The monomer(s) should preferably be dissolvable or dispersable in the solvent at the exposing step. In one embodiment, the one or more monomers are dissolvable in the solvent, when the solvent is in liquid state, in gas state or in supercritical state. Preferably the one or more monomers are dissolvable in the solvent its liquid and/or supercritical state.

The monomers may in principle be any type of polymerizable monomers. Even relatively large monomers can be used, provided that they are dissolvable or dispersable in the solvent. Since the solvent has a low surface tension, it is capable of dissolving a large number of different types of monomers, also monomers that are difficult to dissolve in solvents used in prior art methods.

In one embodiment, the one or more monomers comprise at least 1% by weight, such as at least 10% by weight, such as at least 50% by one or more of the monomers selected from the group consisting of silicon containing monomers such as silanes, such as TEOS (tetraethylorthosilicate or tetraethoxysilane) or chloro- or alkoxy-functional silanes, olefins such as ethylene, propylene, styrene, vinylpyrrolidone, oxygen- and nitrogen-containing monomers such as acrylic derivatives, e.g. acrylic ester and acrylic acid, methacrylic acid and -ester, urethanes, mono- and di-functional alcohols, carboxylic acids, amines, isocyanates, epoxides, aromatic compounds such as aromatics carrying substituents such as alkyl groups and sulfonated aromatics, aromatic resins, imidazol and imidazol derivatives, pyrazoles, quaternary ammonium compounds, polyurethane prepolymers and epoxy resins.

In one embodiment, it is preferred that the one or more monomers comprise at least 50% by weight of vinylpyrrolidone.

In one embodiment, it is preferred that the one or more monomers comprise at least 50% by weight of olefins.

In one embodiment, it is preferred that the one or more monomers comprise at least 50% by weight of silanes.

For providing a simple polymerization step it is in one embodiment desired that the one or more monomers are free radical polymerizable. In another embodiment, the one or more monomers are polymerizable using irradiation e.g. using infrared radiation with a wavelength measured in vacuum of between 0.5 μm and 20 cm, such as between 0.8 μm and 10 cm, such as between 1.0 μm and 1 cm. In one embodiment, the cross-linking is activated by exposing the extruded polymer to electromagnetic waves with a wavelength measured in vacuum of between 2.0 μm and 1000 μm.

Together with the monomer and optionally radical starter, other additives such as pigments and proton-conducting components may be loaded into the silicone polymer composition.

These optional additives as well as optional radical starters may be loaded together with the monomer or they may be loaded separately.

The solvent and the exposing conditions should be selected such that the solvent has a surface tension at the exposing step of about 15 mN/m or less, such as about 10 mN/m or less, such as about 8 mN/m or less, such as about 6 mN/m or less, such as about 5 mN/m or less, such as about 0 mN/m.

Irrespectively of the state of the solvent during the exposing step, it is in one embodiment desired that the solvent has a surface tension in liquid form of about 15 mN/m or less, such as about 10 mN/m or less, such as about 8 mN/m or less, such as about 6 mN/m or less, such as about 5 mN/m or less. Thereby the monomers may be dissolved in the solvent in its liquid step prior to the exposing step.

The solvent may at the exposing step be in any of its states gas state, liquid state and supercritical state.

In one embodiment, the solvent is one or more hydrocarbons or carbon-containing compounds or a composition comprising hydrocarbons or carbon-containing compounds with a Hildebrand solubility of below 11, preferably 8 or less. In this embodiment the silicone polymer composition may preferably be exposed to the solvent in its supercritical state or near it supercritical state, where the term 'near its supercritical state' means that the total pressure is at least 10 bar.

In one embodiment, the solvent comprises one or more compounds from the group of $C_1$-$C_{12}$ hydrocarbons or carbon-containing compounds, preferably $C_1$-$C_4$ hydrocarbons, more preferably selected from the group consisting of methane, ethane, propane, propene, isobutane, butane, butene, isobutene, methanol, and acetone.

In one desired embodiment, the solvent comprises one or both of the compounds $N_2O$ and $CO_2$. The most preferred solvent is a solvent comprising $CO_2$.

In one embodiment, the solvent comprises at least 50%, such as at least 75%, such as at least 90% by weight of one or more of the components selected from the group consisting of $CO_2$, and $N_2O$, and $C_1$-$C_5$ hydrocarbons, the solvent preferably comprising at least 50%, such as at least 90% of $CO_2$.

The solvent may also comprise a surfactant for reducing surface tension. In one embodiment, the solvent comprises a surfactant preferably selected from the group of anionic, cationic, non-ionic and amphoteric surfactants, said solvent preferably comprising up to 5% by weight, such as between 0.001-50 grams of surfactant per kg solvent.

In one embodiment, the pressure during the exposing step may preferably be well above 2 kg/cm$^2$ such as at least 30 kg/cm$^2$, such as at least 40 kg/cm$^2$, such as between 40 and 500 kg/cm$^2$ such as between 50 and 300 kg/cm$^2$ such as between 60 and 200 kg/cm$^2$, such as between 70 and 150 kg/cm$^2$.

It should be understood that the pressure may vary during the exposing step e.g. so that the solvent (preferably comprising or even consisting essentially of $CO_2$) is changing state from liquid to supercritical or vice versa during the exposing step. Such pressure regulation may in one embodiment result in an even faster dispersion and precipitation of the monomer(s).

The temperature at the exposing step may in one embodiment preferably be at least 0° C., such as at least 10° C., such as at least 10° C., such as between 15 and 120° C., such as between 25 and 80° C.

In one embodiment, the solvent consists essentially of $CO_2$. The critical points of a carbon dioxide are about 31.0° C. and 75.3 kg/cm$^2$, and it is referred to as being in a supercritical condition to be in the condition of having exceeded this and to have the in-between property of a liquid and a gas, i.e., the consistency near a liquid, and a diffusion coefficient near a gas. Moreover, although there is no clear definition, generally a subcritical state exists near the supercritical condition, i.e. about 50 kg/cm$^2$ or more and in about 25° C. or more. In one embodiment, it is thus desired that the pressure and temperature is selected so that the $CO_2$ is in its subcritical state during at least part of the exposing step.

For polymerizing and optionally cross-linking the monomer(s) it is in one embodiment desired that a radical starter in an amount preferably being sufficient to initiate the polymerization, is incorporated into the silicone polymer composition. This may be done prior to the vulcanization of the silicone polymer composition, or after the vulcanization e.g. simultaneously with the loading of the monomer(s) into the silicone polymer composition.

In one embodiment, a radical starter is incorporated into the silicone polymer by physical compounding e.g. prior to vulcanization thereof.

In one embodiment, a radical starter is incorporated into the silicone polymer by swelling or impregnation in dissolved condition, or by co-impregnation with the one or more monomers.

In one embodiment, one or more monomers are dissolved in the solvent together with a radical starter, and thereafter the solvent are swelled by the silicone polymer composition.

The amount of radical starter could e.g. be at least 0.01 mol % of the monomer, such as at least 0.01 mol % of the monomer, such as at least 0.1 mol % of the monomer, such as at least 0.5 mol % of the monomer, such as at least 1 mol % of the monomer, such as between 1 and 10 mol % of the monomer. The skilled person will for a specific combination of monomer(s) and radical starter be able to find a suitable amount of radical starter.

The radical starter may be any kind of radical starter, e.g. heat- or radiation activatable radical starters as known in the art. Suitable radical starters are e.g. peroxides such as dicumylperoxide or azo-compounds such as azo-bis-iso-butyronitril, or photo-labile compounds such as benzoyl-based radical starters, said radical starter preferably being.

As mentioned the silicone polymer composition may be exposed to the solvent while the solvent is in liquid state, in gas state and/or in supercritical state. The solvent may change state during the exposing step, e.g. by changing pressure and/or temperature. As it is simpler and faster to control the pressure, change of states during the exposing state is most often induced by adjusting the pressure.

In one embodiment, the silicone polymer composition is exposed to the solvent under conditions where the solvent is in a first state, followed by a change of conditions whereby the solvent changes to a second state, where the first state preferably is liquid state or supercritical state and the second state preferably is gas state.

In one embodiment, the monomer is dissolved in gas solvent, and the silicone polymer composition is exposed to the solvent while the solvent is in liquid state, in gas state and/or in supercritical state.

In one embodiment, the monomer is dissolved in supercritical solvent, and the silicone polymer composition is exposed to the solvent while the solvent is in liquid state, in gas state and/or in supercritical state.

The amount of solvent swelled by the silicone polymer composition may vary largely and is highly dependent on the silicone polymer composition and its vulcanization degree. Even if only small amounts are swelled, the solvent may transport sufficient monomers into the silicone polymer composition as the solvents may be mobile within the silicone polymer composition and pass in and out a number of times during the exposing step.

The exposing time may also vary depending on the desired amount of monomers to be loaded into the silicone polymer composition.

In one embodiment, the silicone polymer composition is exposed to said solvent for a sufficient time to swell the silicone polymer composition with the solvent, preferably to swell the silicone polymer composition with at least 0.01%, such as at least 0.1%, such as at least 1% by weight of solvent calculated on the weight of the silicone polymer composition.

In order to precipitate (load) as much as possible of the monomer(s) into the silicone polymer composition as fast as possible, the pressure and/or the temperature may be varied during the exposing step.

In one embodiment, wherein the silicone polymer composition is exposed to the solvent under varying pressure, the pressure preferably may be decreased after at least a part of the solvent has been swelled into the silicone polymer composition whereby monomer(s) precipitate within the silicone composition.

In one embodiment, wherein the silicone polymer composition is exposed to the solvent under varying temperature, the temperature preferably is decreased after at least part of the solvent has been swelled into the silicone polymer composition whereby monomer(s) precipitate within the silicone composition.

In one embodiment, the one or more monomers are exposed to the solvent for a sufficient time to precipitate at least 0.01%, such as at least 0.1%, such as at least 1% by, such as up to about 50% by weight of monomer(s) of the total weight of the silicone polymer composition.

The silicone polymer composition may in one embodiment be subjected to two or more exposing steps e.g. for increasing the amount of monomers loaded into the silicone polymer composition or for loading different monomers or other additives into the silicone polymer composition in a specified order.

In one embodiment, the silicone polymer composition is exposed in two or more steps to the solvent with one or more monomers to provide at total monomer precipitation of at least 0.01%, such as at least 0.1%, such as at least 1% by, such as up to about 50% by weight of monomer(s) of the total weight of the silicone polymer composition. The two or more steps may be equal to each other or they may be different from each other e.g. with respect to solvent, monomer amounts and/or exposing time.

Typical exposing time for the silicone polymer composition in total is normally within 20 min, such as at least 1 min, such as for 5 min. However, the invention does not exclude higher exposing times, such as exposing times up to several hours.

In one embodiment, it is desired that the solvent during at least part of the exposing time is in its supercritical state.

In one embodiment, the silicone polymer composition is subjected to an extraction step for extraction of silicone oil residues e.g. as disclosed in the co pending application PCT/DK/0300052 which is hereby incorporated by reference.

In one embodiment, the extraction solvent used in the extraction step is identical with the solvent used in the exposing step.

In one embodiment, the silicone polymer composition is treated with the solvent in or near its supercritical state for extracting residues followed by feeding of the monomer into the reaction chamber where the monomer is dissolved in the solvent in or near its supercritical state while the silicone polymer composition simultaneously is exposed to the solvent.

In one embodiment, the silicone polymer composition is exposed to a solvent consisting essentially of carbon dioxide. The $CO_2$ is carrying the monomer(s) in or near its supercritical state for a sufficient time to swell the silicone polymer composition with the solvent containing the monomer(s).

The silicone polymer composition may preferably prior to the exposing step be shaped to the desired shape, e.g. using extrusion, injecting-moulding, calendering, pressing or cutting as it is well known in the art.

The IPNs produced using the method as disclosed above are useful as engineering materials for automotive switches and displays, telecom applications such as EMI shielding, gas separation membranes, membranes for fuel cells and carriers for heterogeneous catalysts.

The IPN produced according to the invention may further be suitable as general light spreading medium, e.g. as lamp cover.

The invention also relates to a method of producing a polymeric unit in particular suitable for automotive or telecom use. This method comprises the steps of producing an IPN as described above followed by a surface treatment e.g. by plasma or flame surface activation and subsequent painting, or immediate painting or coating.

The silicone polymer composition used for the IPN for automotive or telecom use may preferably be transparent. When using a transparent silicone polymer composition, the resulting product may as described above be of milky-white appearance, presumably due to a microstructure of small domains in size below or in the order of the wavelength of visible light, in addition due to different refractive indices of silicone versus monomer, and possibly due to the interpenetrating network structure formed, depending on the concentration of the monomer.

Such a resulting milky-white appearance is preferred for switches illuminated from the backside due to even spreading of light. Furthermore, danger of destroying the thin white paint layer by laser cutting or similar is reduced due to the thickness of the milky-white layer.

In this connection it should be observed that prior art silicone parts are used, e.g. as covers for switches such as steering wheel switches. Such prior art silicone parts are normally produced from transparent silicone applied with a thin white paint layer as well as a darker paint layer which is applied after a suitable surface activation process, e.g. plasma or flame treatment. Symbols are being cut through the dark paint layer using a laser. This way, the switch symbols can be illuminated from the inner side of the switch. Both surface activation and application of a thin paint layer of controlled thickness are, however, difficult, expensive and labor-intensive.

By using the method of the present invention, one painting step is avoided in typical white-plus-colour combinations designed for subsequent laser cutting of symbols.

In one embodiment, the impregnated reactive monomer is made adhesive to paint, e.g. by using styrene, acrylics, urethanes which can chemically add to reactive parts of the paint formulation. This way, plasma or other surface treatment prior to painting is avoided. This way, a cheap and technically improved route is opened.

The invention also relates to a method of producing a polymer membrane comprising the steps of:
producing an IPN unit shaped as a membrane according to the disclosure above, wherein the membrane has a thickness between 5 and 1000 µm.

The amount of monomer precipitated into the membrane shaped silicone polymer composition is preferably 5% by weight or less, such as 2% or less or such as 1% and less.

The membrane may preferably be a membrane for separation of gases or liquids.

In one embodiment, the membrane is a fuel cell membrane. The membrane preferably is less permeable to gases than the original silicone composition at least by a factor of 2. Furthermore it is preferred that the conductivity for protons (H+) preferably is increased in comparison with the original silicone composition by incorporation of proton-conducting monomers such as imidazol or imidazol derivatives. The conductivity for protons (H+) preferably is increased in comparison with the original silicone composition by a factor of at least 10, such as at least 100.

A membrane for fuel cells obtained according to the present invention is relatively cheap, oxidation stable and has low tendency to dry out compared with prior art fuel cell membranes.

Silicone is highly oxidation stable. In advanced applications, fluorinated silicones or silicones carrying phenyl groups may preferably be used. Reactive monomers are chosen which preferably carry as little as possible tertiary H-atoms which are particularly prone to oxidation.

Furthermore, by using the present invention it is possible in a simple manner to produce a membrane that is selectively permeable (or conductive) to protons and hydroxide ions, respectively.

The danger of drying out (loss of water) does practically not exist in case imidazol derivatives or other proton carriers are used.

The invention also relates to the IPN obtained using the methods as disclosed above.

The IPN is preferably a full IPN comprising at least two interpenetrating, individually cross linked networks.

Since the IPN can be produced in the absence of organic solvents, the IPN may preferably be free of organic solvents. Even though organic solvents may be used in the production, the use of solvent comprising $CO_2$, which is preferred, results in an essentially organic solvent free product.

The IPN may in one embodiment comprise a network of a polymer selected from the group consisting of polyvinylpyrrolidone.

EXAMPLES

Example 1

Hydrophilic PDMS

Monomers:

PEG (poly(ethylene glycol)) (Mw=400)

PPG (poly(propylene glycol) (Mw=425)

Poly(ethylene oxide-b-propylene oxide) 0.15:1 (Mw=1100)

Poly(DSM-b-ethylene oxide) 20:80 (Mw=3000)

The samples were made in laboratory scale equipment (reactor volume 5-1000 ml, connected to gas supply, cylindrical inside, heated by a thermostat bath and stirred by a magnetic stirrer). Poly(dimethyl siloxane) (PDMS) rubber was used as substrate (silicone polymer composition).

A typical experiment was done as follows:

The substrate was washed in acetone, dried and placed into the reactor together with the monomer to be impregnated into the substrate. The reactor was closed and pressure increased by adding carbon dioxide typical to a pressure of about 200 to 400 bar. The material in the reactor was stirred using a magnetic stirrer. The temperature was raised to 50° C. Higher or lower temperatures and pressures may be applied. After 2-8 hrs the impregnation was completed, pressure was decompressed to atmospheric pressure, and the samples were post-cured for some hours to remove the whole carbon dioxide.

The samples were analyzed by measurement of the surface tension, weight-increase and FTIR.

The surface tension was for all samples about 30 mN/m. The weight increase was between 0.75 and 1.25% and FTIR spectra showed bonds at 2870 cm-1 (CH2, CH3) and 1348 cm-1 (C—O—C) beside the strong silicone bonds from the substrate.

Products of this type may e.g. be used as follows:
Adhesion to e.g. PS, PP or PE is possible. Products produced as described may thus be used in situations where it should adhere to such polymers.
PEG is biocompatible and the products using PEG as monomers are thus useful in life-science application Example 2

White Surface/Bulk

Monomer:

Styrene

Initiator:

AIBN, dicumylperoxide, benzoylperoxide.

The silicone substrate is as in example 1, and is treated in the same way as described above but with impregnation with both monomer and initiator. Furthermore, the post-curing step is made at high temperature to polymerize and to cross-link the monomer. The temperature is of about 80° C. and the sample is treated for 16 hrs. The result is milky-white silicone rubber with a surface tension of 22 mN/m. The weight increase is about 4% and the FTIR spectra shows the characteristic bonds of polystyrene (beside the strong bonds of the silicone substrate).

Example 3

Hydrophilic+White Surface/Bulk

Substrate;

NVP (N-vinylpyrrolidone)

Monomer:

divinylbenzene

Initiator:

E.g. AIBN (azo-isobutyronitril)

The substrate is impregnated with monomer and initiator by a treatment similar to the treatment in example 1 above, but the post-curing step is made at high temperature to polymerize and to cross link the monomer. The temperature is of about 80° C. and the sample is treated for 16 hrs. The result is creamy-white silicone rubber with a surface tension of 35 mN/m. The weight increase is about 12% and in the FTIR spectra a bond at 1670 cm-1 is the proof of the C=O bond of PVP.

Example 4

Hydrophilic+White Surface/Bulk

Monomer:

PDMS impregnated with PS (polystyrene)

Monomer: NVP

Crosslinker: Divinylbenzene

Initiator: AIBN

The substrate, which already is impregnated with PS, is treated the same way as described in example 3 above. The result is a milky-white silicone rubber with a surface tension of 40 mN/m.

Particular useful for painting/dyeing on the silicone surface

Example 5

Coloured Surface/Bulk

Added colours: red (perylenes; Oracet Red, Ciba, anthraquinone), blue (Victoria blue; Oracet Blue G, Ciba, phthalocyanine), green (brilliant green), yellow (Macolex Yellow 4G, Bayer Chemicals, Azo dyestuff; Oracet Yellow GHS, Ciba, anthraquinone)

Samples are made as described in the examples 1-4 above, but with the additional impregnation with one or more of the added colours and without polymerization in the post-curing step. Deepness of the final colour is dependent on the time of treatment but the transparency of the substrate is preserved.

The final product is thus a transparent coloured silicone rubber.

Example 6

Automotive Parts

A transparent silicone rubber is exposed to pressurized carbon dioxide which is able to extract volatile or low molecular weight residues from the rubber. At the same time (or later), a reactive monomer such as silanes such as TEOS, styrene, acrylic derivatives (such as acid or ester), vinylpyrrolidone, isocyanate or any other reactive monomer is introduced, dissolved in carbon dioxide. Optionally, a radical starter such as azo-bis-iso-butyronitril, peroxides or the like is added in small concentrations such as 1% of the reactive monomer. The reactive monomer is evenly distributed within the silicone rubber, such as at 4% wt. of the rubber. After removal of the solvent carbon dioxide, residual monomer can be recycled or discarded.

The polymer products are exposed to high temperature, e.g. in the same reactor which is used for carbon dioxide treatment, to let the reactive monomer polymerize.

The resulting product is of milky-white appearance, presumably due to a microstructure of small domains in size below or in the order of the wavelength of visible light, in addition due to different refractive indices of silicone versus monomer, and possibly due to the interpenetrating network structure formed, depending on the concentration of the monomer.

Example 7

Membranes for Fuel Cells

Manufacturing as described in example 6. The target membrane is not permeable to gases, but conductive for protons or hydroxide ions. In addition, good contact to porous, e.g. ceramic electrodes, is desired.

Useful monomers are silanes such as TEOS, styrene, aromatic compounds carrying groups which render the molecule less mobile and volatile, such as trialkyl-groups, optionally the aromatic core(s) being sulfonated or otherwise converted into acids, aromatic resins, typical known proton carriers such as imidazol derivatives, pyrazoles, quaternary ammonium compounds and various others.

The loading of silicone rubber with reactive monomer may be carried out more than once in order to achieve maximum loading, i.e. limited gas permeability.

Example 8

Gas Separation Membranes

A low degree of loading of reactive monomers, such as 0.1% weight of silicone, is chosen to modify thin tubes of silicone rubber. This way, the high gas permeability of silicone is preserved, however, the reactive monomer modifies the permeability of certain gases. Paraffinic impregnation, as one example, hinders the diffusion of paraffinic gases and allows the separation, e.g. of methane and oxygen.

Example 9

Water Repellent Membrane

To make a silicone substrate water repellent the pores in the bulk can be filled up with a hydrophobic compound like fluorpolymeres or paraffines using the method of the invention.

Example 10

Gas Separation Membrane

Impermeable to carbon dioxide or oxygen
Gas barrier membrane: IPN of silicone rubber with impregnated and crosslinked barrier compound: ethylvinyl alcohol, poly(vinylidene chloride), poly(vinylidene chloride-co-vinyl chloride.
The silicone substrate was impregnated with ethylvinyl alcohol, poly(vinylidene chloride), poly(vinylidene chloride-co-vinyl chloride e.g. as disclosed in example 2.

Example 11

Gas Separation Membrane

Impermeable to carbon dioxide or oxygen
Gas absorption: IPN of silicone rubber and an active compound which can react with CO2 to e.g. carbonate or hydrogen carbonate. The active compound could be an amine e.g. ethanolamine.
The silicone substrate was impregnated with ethanolamine and hydrogen carbonate using the method as disclosed in example 2.

Example 12

Gas Separation Membrane

Impermeable to hydrogen but permeable to H+
IPN of silicone rubber with imidazole, sulfonated polymers or heteropolyacids (HPS) to make polymer fuel cell membranes which are stable up to 250° C. Heteropolyacids could be e.g. 12-phosphortungstic acid, 12-silicotungstic acid or 12-phosphormolyndic acid but others could also be used.
The silicone substrate was impregnated with 12-phosphortungstic acid using the method as disclosed in example 2.

The invention claimed is:
1. A method of producing an interpenetrating polymer network (IPN) comprising the steps of
   i) providing a silicone polymer composition,
   ii) providing one or more monomers for a polymer,
   iii) providing a solvent for the one or more monomers,
   iv) exposing said silicone polymer composition to said one or more monomers and said solvent to precipitate monomer within said silicone polymer composition and
   v) polymerizing said monomer to form an IPN,
wherein said solvent has a surface tension at the exposing step of about 15 mN/m or less.

2. A method of producing an IPN according to claim 1, wherein said solvent has a surface tension in liquid form of about 15 mN/m or less.

3. A method of producing an IPN according to claim 1, wherein said silicone polymer composition comprises at least 10% by weight of polymer having a backbone consisting of Si and O molecules.

4. A method of producing an IPN according to claim 1, wherein said silicone polymer composition comprises at least 10% by weight of polymer having a backbone consisting of Si molecules.

5. A method of producing an IPN according to claim 1, wherein said silicone polymer composition comprises at least 10% by weight of polysiloxane polymer.

6. A method of producing an IPN according to claim 1, wherein said silicone polymer composition comprises one or more polymers selected from the group consisting of dimethyl polysiloxane, methylphenyl polysiloxane, fluorosilicone rubber, silicone esters, polysiloxanes, polysilanes, polychlorosilanes, polyalkoxysilanes, polyaminosilanes, polydialkylsiloxanes, and polysiloxanes containing phenyl substituents, said polymers of the silicone polymer composition optionally being vinyl-functionalized and/or optionally being partially or fully fluorinated.

7. A method of producing an IPN according to claim 1, wherein said silicone polymer composition comprises up to 90% by weight of non-silicone polymers or co-polymers, fillers and/or additives, said non-silicone polymers being thermoplastics or thermosets, and being selected from polyolefins, polyesters, polyurethanes, polycarbonates, and polyvinyl polymers, said fillers being particles or fibres in the form of minerals or organic fillers, and being selected from silica, metals, metal oxides, mixed metal oxides, glass beads and glass fibers, and additives being selected from adhesion promoters, process and plasticizing oils, antioxidants and pigments.

8. A method of producing an IPN according to claim 1, wherein said silicone polymer composition is partially vulcanized.

9. A method of producing an IPN according to claim 1, wherein said silicone polymer composition is a vulcanized rubber.

10. A method of producing an IPN according to claim 1, wherein said one or more monomers are dissolvable in said solvent when said solvent is in liquid state, in gas state or in supercritical state.

11. A method of producing an IPN according claim 1, wherein said one or more monomers comprise at least 1% by weight of one or more of the monomers selected from silicone containing monomers, olefins, styrene, vinylpyrrolidone, oxygen- and nitrogen-containing monomers, aromatic compounds, aromatic resins, imadazol and imidazol derivatives, pyrazoles, quaternary ammonium compounds, polyurethane prepolymers and epoxy resins.

12. A method of producing an IPN according to claim 1, wherein said one or more monomers comprise at least 50% by weight of vinylpyrrolidone.

13. A method of producing an IPN according to claim 1, wherein said one or more monomers comprise at least 50% by weight of olefins.

14. A method of producing an IPN according to claim 1, wherein said one or more monomers comprise at least 50% by weight of silanes.

15. A method of producing an IPN according to claim 1, wherein said one or more monomers are free radical polymerizable.

16. A method of producing an IPN according to claim 1, wherein the solvent is one or more hydrocarbons or carbon-containing compounds or a composition comprising hydrocarbons or carbon-containing compounds with a Hildebrand solubility of below 11, the silicone polymer composition being exposed to the solvent in its supercritical state or near its supercritical state, where the term 'near its supercritical state' means that the total pressure is at least 10 bar.

17. A method of producing an IPN according to claim 1, wherein the solvent comprises one or more compounds from the group of $C_1$-$C_{12}$ hydrocarbons or carbon-containing compounds, methanol, acetone, $N_2O$ and $CO_2$, the silicone polymer composition being exposed to the solvent in supercritical state.

18. A method of producing an IPN according to claim 1, wherein the solvent has a surface tension in liquid form of about 15 mN/m or less, the silicone polymer composition being exposed to the solvent while it is in one or more of its states liquid state, gas state and supercritical state.

19. A method of producing an IPN according to claim 18, wherein said solvent comprises at least 50% by weight of one or more of the components selected from the group consisting of $CO_2$, and $N_2O$ and $C_1$-$C_5$ hydrocarbons, the solvent comprising at least 50% by weight of $CO_2$.

20. A method of producing an IPN according to claim 1, wherein the solvent comprises a surfactant selected from anionic, cationic, non-ionic and amphoteric surfactants, said solvent comprising up to 5% by weight of surfactant.

21. A method of producing an IPN according to claim 1, wherein a radical starter is incorporated into said silicone polymer, by physical compounding, by swelling or impregnation in dissolved condition, or by co-impregnation with the one or more monomers, the amount of radical starter being sufficient to initiate the polymerization.

22. A method of producing an IPN according to claim 21, wherein the amount of radical starter is at least 0.01 mol % of the monomer.

23. A method of producing an IPN according to claim 21, wherein said radical starter is selected from peroxides, azo-compounds, and photo-labile compounds, said radical starter being heat- or radiation activatable.

24. A method of producing an IPN according to claim 1, wherein said one or more monomers are dissolved in the solvent together with a radical starter, the amount of radical starter being sufficient to initiate the polymerization.

25. A method of producing an IPN according to claim 1, wherein said monomer is dissolved in liquid solvent, said silicone polymer composition being exposed to said solvent while the solvent is in liquid state, in gas state and/or supercritical state.

26. A method of producing an IPN according to claim 1, wherein said monomer is dissolved in gas solvent, said silicone polymer composition being exposed to said solvent while the solvent is in liquid state, in gas state and/or in supercritical state.

27. A method of producing an IPN according to claim 1, wherein said monomer is dissolved in supercritical solvent, said silicone polymer composition being exposed to said solvent while the solvent is in liquid state, in gas state and/or in supercritical state.

28. A method of producing an IPN according to claim 1, wherein said silicone polymer composition is exposed to said solvent for a sufficient time to swell the silicone polymer composition with at least 0.01% by weight of solvent calculated on the weight of the silicone polymer composition.

29. A method of producing an IPN according to claim 1, wherein said silicone polymer composition is exposed to said solvent under varying pressure, the pressure being decreased after at least part of the solvent has been swelled into the silicone polymer composition whereby monomer(s) precipitate within the silicone composition.

30. A method of producing an IPN according to claim 1, wherein said silicone polymer composition is exposed to said solvent under varying temperature, the temperature being decreased after at least part of the solvent has been swelled into the silicone polymer composition whereby monomer(s) precipitate within the silicone composition.

31. A method of producing an IPN according to claim 1, wherein said silicone polymer composition is exposed to said solvent under conditions where the solvent is in a first state, followed by a change of conditions whereby the solvent changes to a second state, said first state being liquid state or supercritical state and said second state being gas state.

32. A method of producing an IPN according to claim 1, wherein said silicone polymer composition is exposed to said solvent with said one or more monomers for a sufficient time to precipitate at least 0.01% by weight of monomer(s) of the total weight of the silicone polymer composition.

33. A method of producing an IPN according to claim 1, wherein said silicone polymer composition is exposed in two or more steps to said solvent with one or more monomers to provide at total monomer precipitation of at least 0.01% by weight of monomer(s) of the total weight of the silicone polymer composition, said two or more steps being equal or different from each other with respect to solvent, monomer amounts and/or exposing time.

34. A method of producing an IPN according to claim 31, wherein said silicone polymer composition is exposed to said solvent with said one or more monomers for a total time of at least 1 min.

35. A method of producing an IPN according to claim 1, wherein said silicone polymer composition is treated with the solvent in or near its supercritical state followed by feeding of the monomer into the reaction chamber where the monomer is dissolved in the solvent in or near its supercritical state while the silicone polymer composition simultaneously is exposed to the solvent.

36. A method of producing an IPN according to claim 1, wherein said silicone polymer composition is exposed to a solvent consisting essentially of carbon dioxide and carrying the monomer(s) in or near its supercritical state, for a sufficient time to swell the silicone polymer composition with the solvent carrying the monomer(s).

37. A method of producing an IPN according to claim 1, wherein said silicone polymer composition prior to the exposing step is shaped, by extrusion, injecting-moulding, calendering, pressing or cutting.

38. A method of producing a polymeric unit comprising:
producing an IPN unit in a desired shape by a method according to claim 1, and
treating the surface thereof by plasma or flame surface activation and subsequent painting, or immediate painting or coating.

39. A method of producing a polymeric unit according to claim 38 wherein the silicon polymer composition used for the IPN is transparent.

40. A method of producing a polymer unit according to claim 38, wherein the one or more monomers comprise one or more monomers selected from styrene, acrylics and urethanes.

41. An automotive part comprising a polymeric unit obtained by a method according to claim 38.

42. A telecom part comprising a polymeric unit obtained by a method according to claim 38.

43. A medical device selected from catheter, part of a pace maker and an implant, comprising a polymeric unit obtained by a method according to claim 38.

44. A method of producing a polymer membrane comprising:
producing an IPN unit shaped as a membrane by a method according to claim 1, wherein the membrane has a thickness between 5 and 1000 µm.

45. A method of producing a polymer membrane according to claim 44, wherein the amount of monomer precipitated into the silicone polymer composition is 5% by weight or less.

46. A method of producing a polymer membrane according to claim 44, wherein the membrane is a membrane for separation of gases or liquids.

47. A method of producing a polymer membrane according to claim 44, wherein the membrane is a fuel cell membrane, said membrane being less permeable to gases than the original silicone composition at least by a factor of 2, and whereby the conductivity for protons ($H^+$) is increased in comparison with the original silicone composition by incorporation of proton-conducting monomers, the conductivity for protons ($H^+$) being increased in comparison with the original silicone composition by a factor or at least 10.

* * * * *